Feb. 2, 1932.  S. M. COFFMAN  1,843,597
AERIAL DELIVERY APPARATUS
Filed Oct. 20, 1930    2 Sheets-Sheet 1
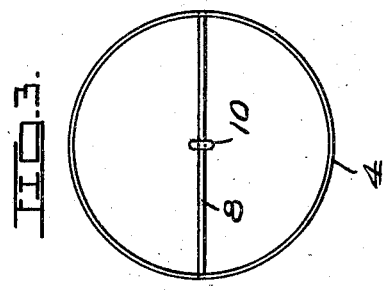
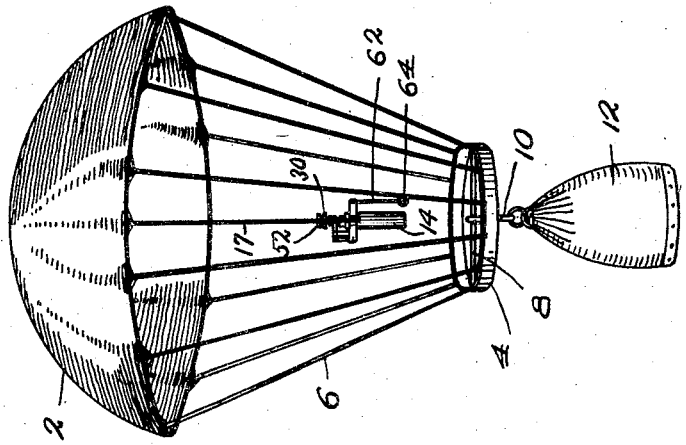
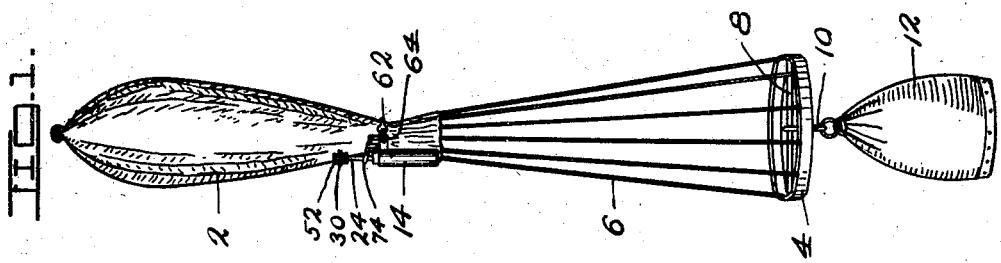
INVENTOR:
Samuel M. Coffman,
BY
F. G. Fischer,
ATTORNEY.
Witness:
Fred G. Fischer.

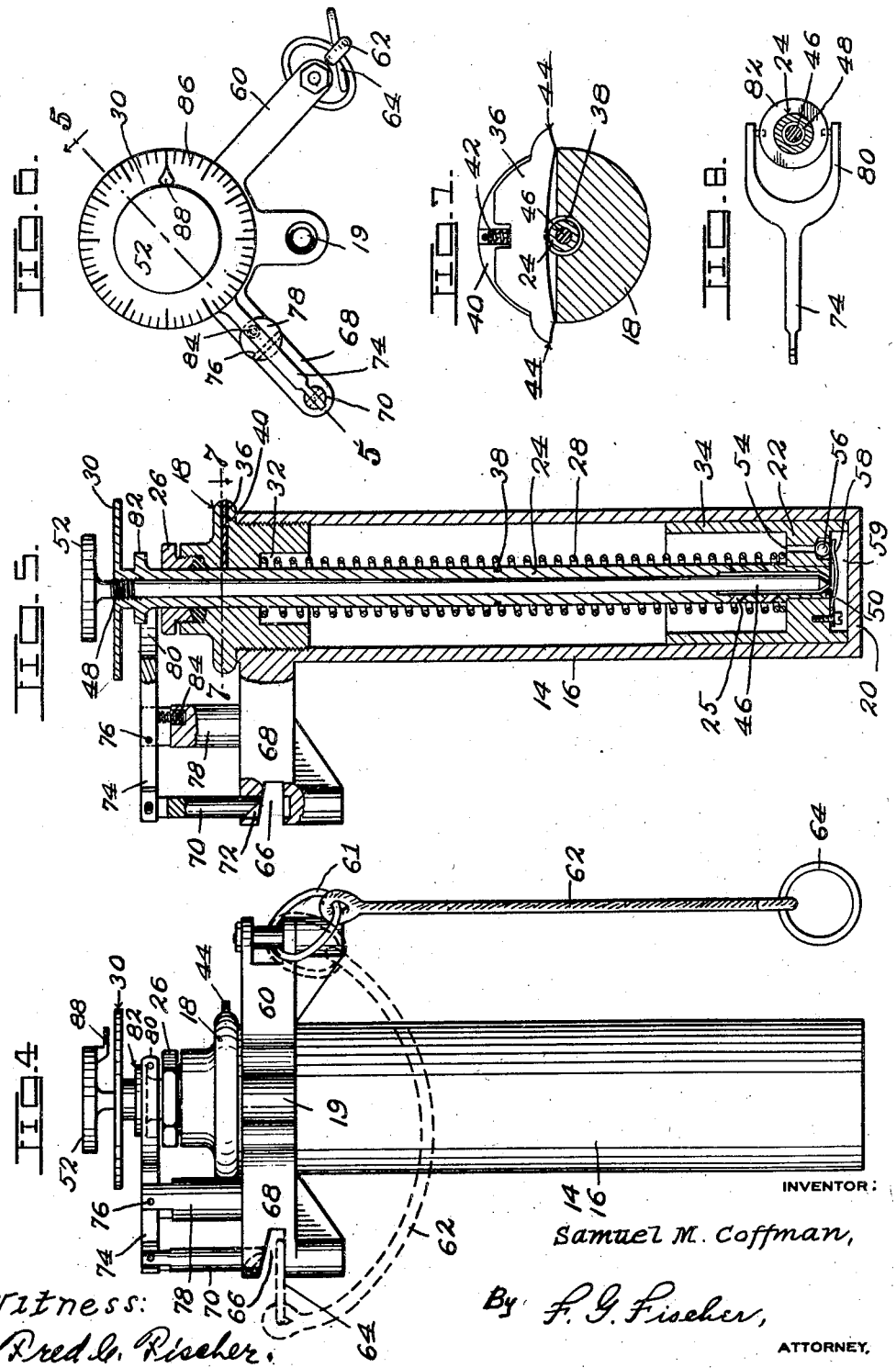

Patented Feb. 2, 1932

1,843,597

UNITED STATES PATENT OFFICE

SAMUEL M. COFFMAN, OF KANSAS CITY, MISSOURI, ASSIGNOR, BY DIRECT AND MESNE ASSIGNMENTS, OF ONE-SIXTH TO ANDREW H. REED, ONE-THIRD TO CHARLES W. TURNER, AND ONE-SIXTH TO LILY O. COFFMAN, ALL OF KANSAS CITY, MISSOURI

AERIAL DELIVERY APPARATUS

Application filed October 20, 1930. Serial No. 489,922.

My invention relates to aerial delivery apparatus and while unlimited to any specific purpose, is particularly useful in delivering mail, merchandise, etc., from aerial craft while in flight so that delays incidental to landing the craft for making such deliveries may be avoided.

In carrying out the invention a suitable receptacle is provided for holding the matter to be delivered and a parachute is employed for retarding the descent of said receptacle after the apparatus has been dropped from the aircraft so that the contents of the receptacle will not be damaged from impact with the ground on landing. In order to prevent the parachute from drifting to any great extent in its descent to the ground it is held in closed position by means of a timing device. Said timing device is set to release said parachute and permit the same to open after it has fallen a predetermined distance from the aircraft which latter is flown at a predetermined altitude when the apparatus is dropped.

In order that the invention may be fully understood reference will now be had to the accompanying drawings, in which:

Fig. 1 shows the apparatus with the parachute folded and ready for its descent to the ground.

Fig. 2 shows the apparatus with the parachute in open position after being automatically released from closed position by the timing device.

Fig. 3 is a detail plan view of an annulus employed in carrying out the invention.

Fig. 4 is a detail side elevation of the timing device.

Fig. 5 is a sectional view of the timing device on line 5—5 of Fig. 6.

Fig. 6 is a plan view of the timing device.

Fig. 7 is a cross section on line 7—7 of Fig. 5, of a cap forming part of the timing device.

Fig. 8 is a detail plan view partly in section of a lever and some of the parts associated therewith.

Referring in detail to the different parts, 2 designates a parachute of any approved form having its lower margin connected to an annulus 4 by means of a plurality of cords 6. The annulus 4 is provided with a transverse rod 8 equipped with a centrally-disposed hook 10 to which a container 12 is secured and in which mail matter, express packages, etc., are placed for delivery from the aircraft.

14 designates a timing device for holding the parachute in closed position as shown by Fig. 1, for any predetermined length of time after being dropped from the aircraft. Said timing device 14 embraces a chamber in the form of a cylinder 16 closed at its upper and lower ends by a cap 18 and a bottom portion 20, respectively. The cylinder 16 is connected to the parachute 2 by suitable means such as a cord 17 which is attached to an eye 19 on said cylinder.

The cylinder 16 is provided with a reciprocatory plunger consisting of a head 22 and a hollow stem 24, which latter is provided with ports 25. The cap 18 has a stuffing box 26 whereby an air-tight joint may be obtained around the hollow stem 24.

The plunger is normally held in its lowermost position as shown by Fig. 5, by resilient means such as a coil spring 28 bearing at its upper and lower ends against the cap 18 and the plunger 22, respectively. The plunger is set for action by manually pulling it outwardly against the action of the spring 28 through suitable means such as a knob 30 fixed to the upper end of the hollow stem 24. In order to prevent undue compression of the spring 28 while the plunger is being pulled outwardly as stated, a recess 32 is formed in the cap 18 to receive one end of said spring, while the plunger head 22 is provided with a skirt 34 surrounding the other end of the spring and adapted to contact with the inner end of the cap 18 and thus limit the upward movement of the plunger head 22.

When pulled outwardly the plunger is automatically secured in set position by means of a catch 36 which enters a peripheral groove 38 in the hollow stem 24. The catch 36 is operably mounted in a slot 40 in the cap 18 and pressed against the hollow stem 24 by means of a coil spring 42 seated in said cap. The ends 44 of the catch 36 project from each side of the slot 40 so that either of said ends 44 may be engaged and pressed backwardly with the thumb when it is desired to disengage the catch from the grooved portion 38 of the stem 24.

46 designates a needle valve extending outwardly through the hollow stem 24 in the upper portion of which it is threaded as indicated at 48, Fig. 5, so that it may be adjusted to open or close a port 50 formed in the lower portion of the stem 24 and communicating with the ports 25. The outer end of the needle valve 46 is provided with suitable means such as a knob 52 whereby it may be manually rotated when it is desired to adjust said needle valve up or down for the purpose of regulating the action of the timing device.

54 designates a port extending through the plunger head 22 so that the plunger may be manually raised without much resistance from the fluid within the cylinder 16. The port 54 is provided at its enlarged lower portion with a ball valve 56 which closes said port to retard the downward movement of the plunger. The valve 56 is normally held to its seat by means of a spring 58 secured in a recess 59 in the lower portion of the plunger head 22.

60 designates an arm projecting from the upper portion of the cylinder 16 and provided with a ring 61 to which a cord 62 is attached for holding the parachute 2 in closed position. The free end of the cord 62 is provided with a ring 64 adapted to enter a cavity 66 in an arm 68 projecting from the upper portion of the cylinder 16. The arms 60 and 68 diverge from the cylinder 16, as shown by Fig. 6, to coact with the cord 62 in encircling the lower portion of the parachute for the purpose of securing the latter in closed position. The ring 64 may be releasably secured in the cavity 66 by means of a latch pin 70 operating in a hole 72 in the arm 68.

The upper end of the latch pin 70 is operably connected to a lever 74 fulcrumed at 76 to a post 78 and provided with a bifurcated end 80 arranged in the path of a collar 82. The bifurcated end 80 is yieldably held in raised position by means of a spring 84 seated in the upper portion of the post 78. The collar 82 is formed integral with or otherwise firmly secured to the upper portion of the hollow stem 24 a short distance beneath the knob 30, which latter is provided with a suitably graduated dial 86 over which a pointer 88, fixed to the knob 52, is adapted to sweep.

The operation briefly stated is as follows: The plunger is manually pulled outwardly until automatically engaged and held in raised position by the catch 36 entering the groove 38. The needle valve 46 is then adjusted to open the port 50 a predetermined amount by rotating the knob 52 until the pointer 88 reaches the proper graduation mark on the dial 86. The cord 62 is then placed around the lower portion of the parachute 2 to hold the same in closed position and the ring 64 is secured in the cavity 66 by means of the latch pin 70. As the aircraft carrying the apparatus is about to pass over the airport or other point at which the mail matter and packages are to be delivered the catch 36 is manually disengaged from the grooved portion 38 of the plunger just before the apparatus is dropped from the aircraft. When thus released from the catch 36 the plunger is forced downwardly by the spring 28 at a speed which is regulated by the needle valve 46 which allows fluid in the lower portion of the cylinder to pass upwardly at a certain rate through the ports 50 and 25. As the plunger approaches the end of its downward movement the collar 82 contacts and depresses the bifurcated end 80 of the lever 74 and causes the latter to raise the latch pin 70 out of engagement with the ring 64. When the ring 64 is thus released the cord 62 becomes disengaged from the parachute by the timing device which drops until checked by the cord 17. On being freed from the cord 62 the parachute 2 opens in the usual manner and thus retards the downward movement of the apparatus so that the contents of the container 12 will not be damaged from impact with the surface of the ground. The fluid for retarding the downward movement of the plunger in the cylinder 16 may be in the form of air or any suitable liquid.

From the foregoing description it is apparent that by properly proportioning the working parts of the timing device the latter may be set to release the parachute after the same has approached to within any desired distance of the surface of the ground, it being understood of course that the aircraft is to fly at a predetermined altitude as the apparatus is dropped from said aircraft.

While I have shown one form of the invention it is to be understood that I reserve all rights to such changes and modifications thereof as properly fall within the spirit and scope of the invention as claimed.

Having thus described my invention, what I claim and desire to secure by Letters Patent, is:

1. An apparatus of the character described consisting of a parachute, a cord for holding said parachute in closed position, a chamber with which said cord is associated, a plunger operably mounted in said chamber and adapted to be manually moved in one direction, means for forcing said plunger in the opposite direction, and latch means actuated by said plunger for releasably holding the cord around the parachute.

2. An apparatus of the character described consisting of a parachute, a cord for holding said parachute in closed position, a chamber with which said cord is associated, a plunger operably mounted in said chamber and adapted to be drawn outwardly, means for releasably holding said plunger in outward position, means for forcing the plunger inwardly when released, and latch means actuated by said plunger as it is forced inwardly for releasably holding the cord around the parachute.

3. An apparatus of the character described consisting of a parachute, a cord for holding said parachute in closed position, a chamber with which said cord is associated, a plunger operably mounted in said chamber and adapted to be manually moved in one direction, means for forcing said plunger in the opposite direction, means for controlling the speed of the plunger when moving in the last-mentioned direction, and latch means actuated by said plunger for releasably holding the cord around the parachute.

4. An apparatus of the character described consisting of a parachute, a cord for holding said parachute in closed position, a chamber with which said cord is associated, a plunger reciprocably mounted in said chamber and including a head provided with a port for the passage of a fluid, a valve for controlling the passage of fluid through said port, and means actuated by said plunger for releasably holding the cord around the parachute.

5. An apparatus of the character described consisting of a parachute, a cord for holding said parachute in closed position, a chamber with which said cord is associated, a plunger reciprocably mounted in said chamber and including a head provided with a port for the passage of a fluid, an adjustable valve for controlling the passage of fluid through said port, dial and pointer means to enable said valve to be adjusted as desired, and means actuated by said plunger for releasably holding the cord around the parachute.

6. An apparatus of the character described consisting of a parachute, means for holding said parachute in closed position, a cylinder to which said holding means is connected, latch means on the cylinder for releasably securing said holding means in active position, and plunger means operably mounted in the cylinder for disengaging said latch means from the holding means.

7. An apparatus of the character described consisting of a parachute, means for holding said parachute in closed position, latch means for releasably securing said holding means in active position, a cylinder to which said holding means is secured, and a plunger reciprocably mounted in said cylinder and adapted to disengage said latch means from the parachute holding means.

8. A timing device consisting of a cylinder, a plunger head reciprocably mounted in said cylinder and having a port extending therethrough, a hollow plunger stem secured to said head and extending through one end of said cylinder, a needle valve adjustably mounted in said plunger stem and adapted to open or close said port, a cord secured to the cylinder, and latch means actuated by the plunger stem and adapted to releasably engage said cord.

9. A timing device consisting of a cylinder, a plunger head reciprocably mounted in said cylinder and having a port extending therethrough, a hollow plunger stem secured to said head and extending through one end of said cylinder, a needle valve adjustably mounted in said plunger stem and adapted to open or close said port, knobs on the plunger stem and said needle valve, a dial on one of said knobs, a pointer on the other knob and adapted to coact with said dial in adjusting the needle valve, a cord secured to the cylinder, and latch means actuated by the plunger stem and adapted to releasably engage said cord.

10. A timing device consisting of a cylinder, a plunger reciprocably mounted in said cylinder and provided with ports, spring means for forcing said plunger on its inward stroke, a valve for closing one of said ports on the inward stroke of the plunger, a manually adjustable valve for regulating the flow of fluid through the other port during the operation of the plunger, suitable holding means associated with the cylinder, a latch pin for releasably securing said holding means in active position, and a lever which is caused by the plunger to release said latch pin from the holding means at a predetermined time.

11. A timing device consisting of a cylinder, a plunger reciprocably mounted in said cylinder and provided with ports, a valve for closing one of said ports on the inward stroke of the plunger, a manually adjustable valve for regulating the flow of fluid through the other port during the operation of the plunger, two arms diverging from the cylinder, a cord attached to one of said arms, and means for releasably securing the cord to the other arm and which is actuated by the plunger.

In testimony whereof I affix my signature.

SAMUEL M. COFFMAN.